United States Patent [19]

Stent

[11] 3,893,349
[45] July 8, 1975

[54] STEERING WHEEL FOR VEHICLES
[75] Inventor: Vernon Denis Stent, Guildford, England
[73] Assignee: Creators Limited, England
[22] Filed: Feb. 20, 1974
[21] Appl. No.: 444,251

[30] Foreign Application Priority Data
Feb. 21, 1973  United Kingdom................. 8395/73

[52] U.S. Cl..................................... 74/552; 74/552
[51] Int. Cl............................................ B62d 1/04
[58] Field of Search........................................ 74/552

[56] References Cited
UNITED STATES PATENTS
1,925,887  9/1933  Waner................... 74/552
3,714,844  2/1973  Tsuda..................... 74/552
3,738,885  6/1973  LeCompte................ 74/552 X
D95,040   4/1935  Herbolsheimer........... 74/552 X FOREIGN PATENTS OR APPLICATIONS
318,614  6/1934  Italy........................ 74/552

Primary Examiner—Samuel Scott
Assistant Examiner—F. D. Shoemaker
Attorney, Agent, or Firm—Larson, Taylor and Hinds

[57] ABSTRACT

A steering wheel for a vehicle comprising a rim, spokes and a hub, wherein the rim comprises a plurality of separately made metallic sections each of which is bent inwards at its ends to form spoke parts.

7 Claims, 9 Drawing Figures

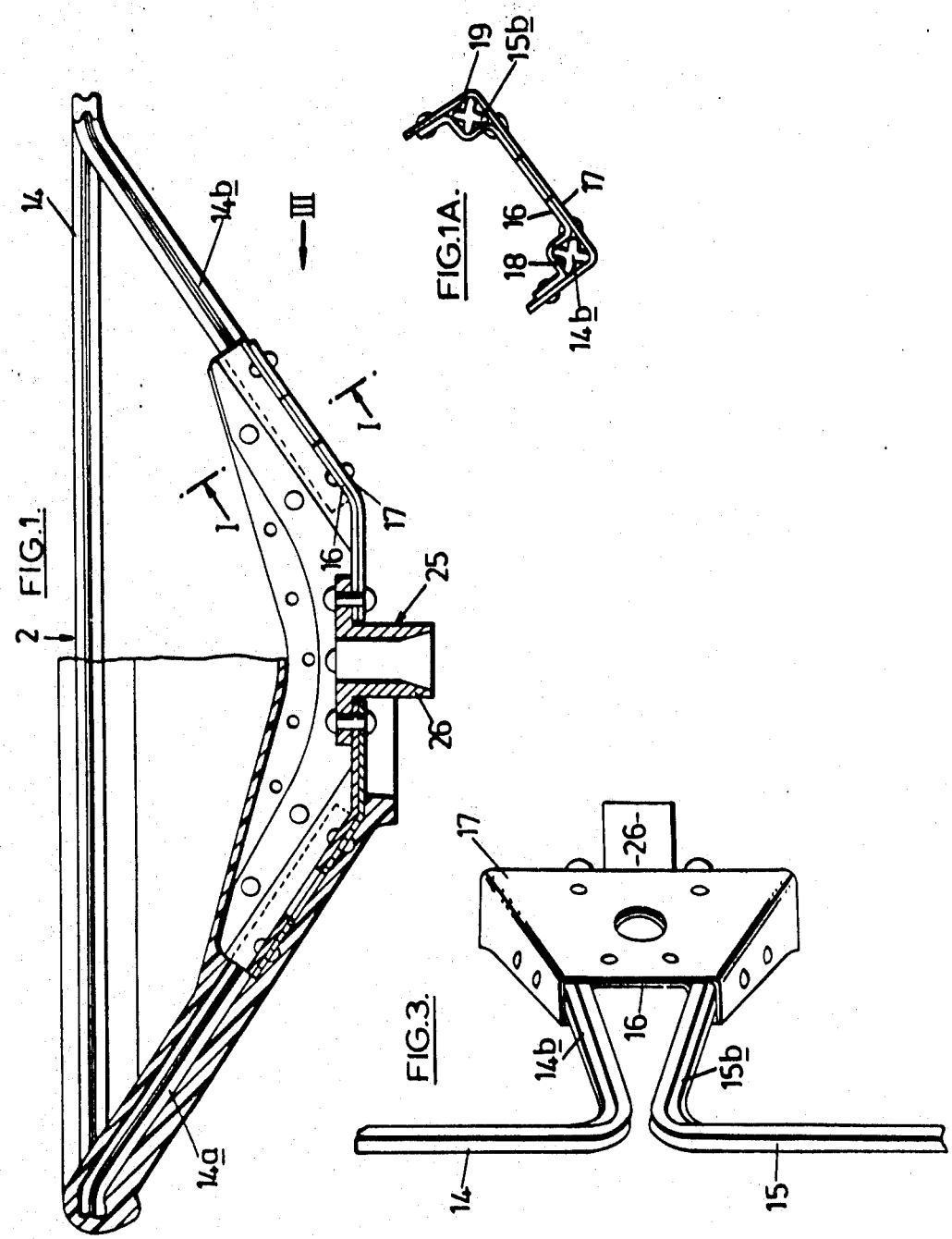

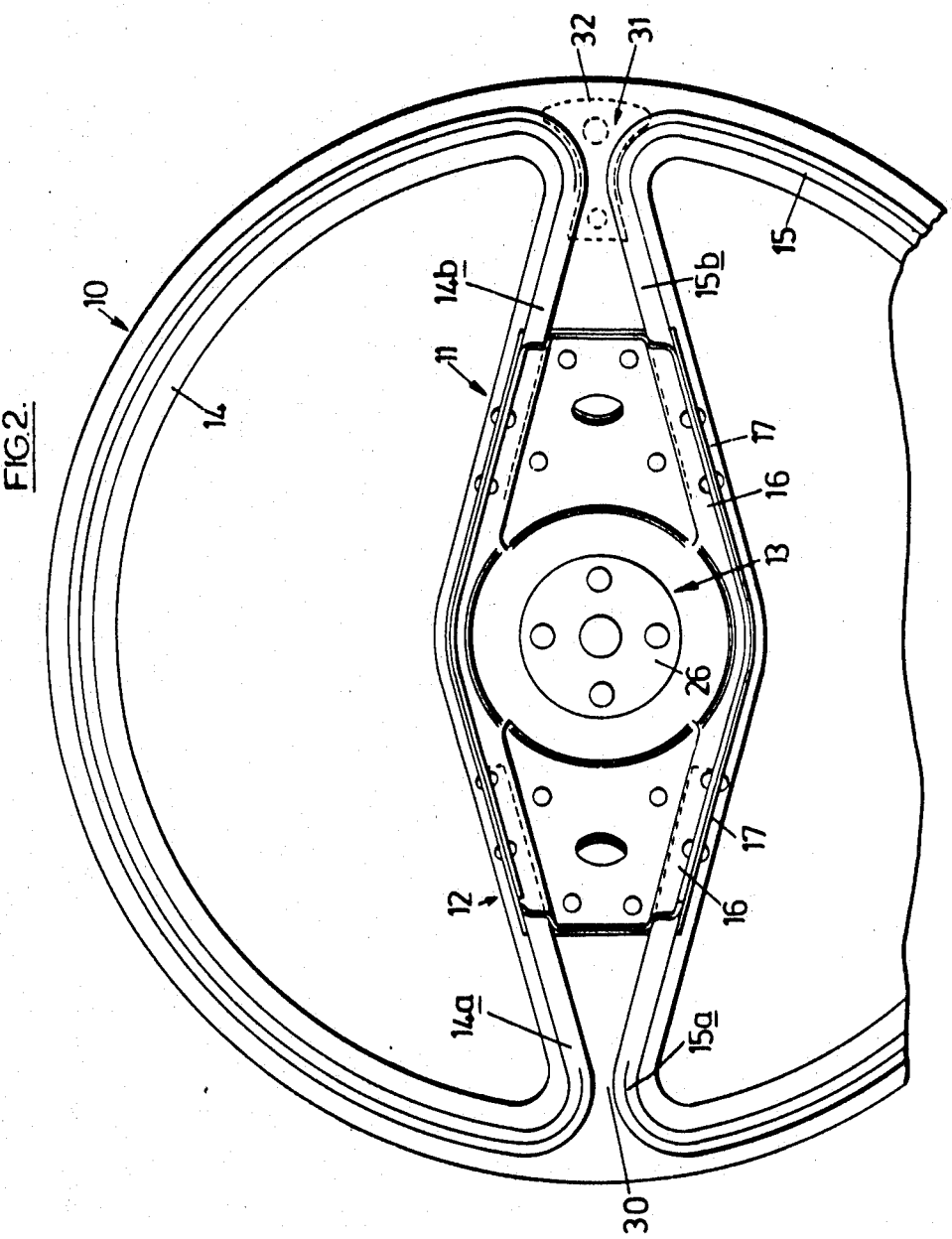

STEERING WHEEL FOR VEHICLES

This invention relates to steering wheels for vehicles.

In the traditional method of manufacturing steering wheels, the three elements of rim, spokes and central hub are usually separate pieces which are welded together to form the metal frame of the wheel, this frame being covered, e.g., by extrusion with a material such as p.v.c. In some more modern constructions the separate spokes may be replaced by a single cross member which is butt-welded to the rim at its opposed ends. The need for a number of welding operations and the use of several components in the manufacture of steering wheels makes the manufacturing operation somewhat cumbersome and furthermore each weld is a source of potential weakness which is dangerous in the event of accident impact.

It is an object of the present invention to simplify the manufacturing operation, e.g., by reducing the number of components used and the number of weld-joints involved at the critical points in the wheel.

According to the present invention there is provided a steering wheel for a vehicle comprising a rim, spokes and a hub, wherein the rim comprises a plurality of separately made metallic sections each of which is bent inwards at its ends to form spoke parts.

Figure 4:
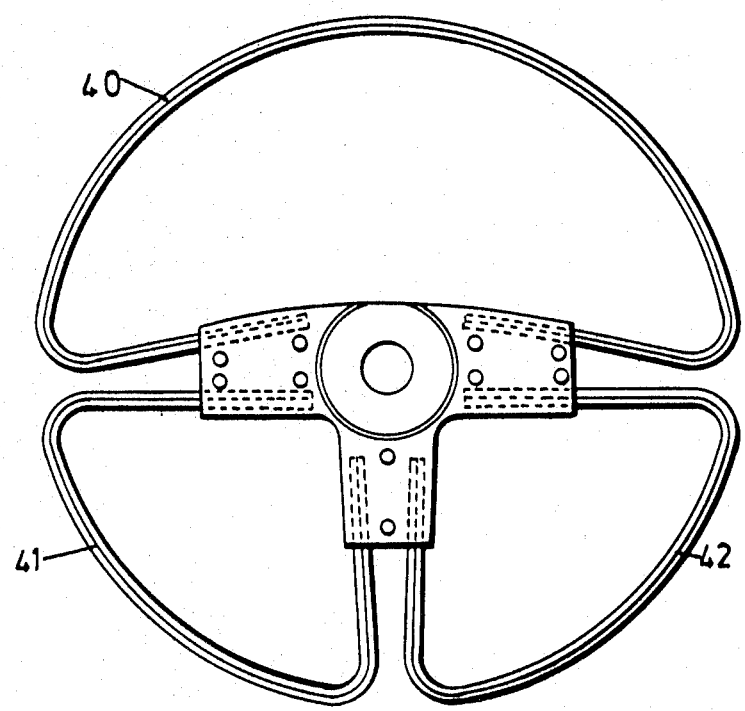
Figure 5:
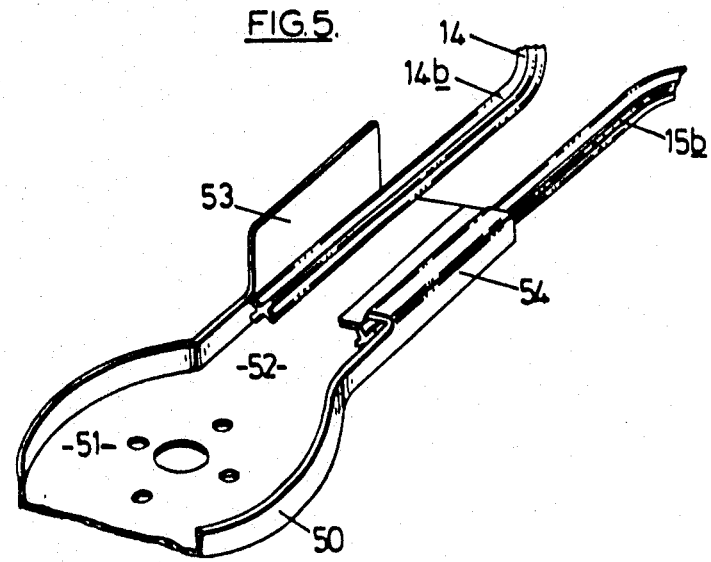
Figure 6:
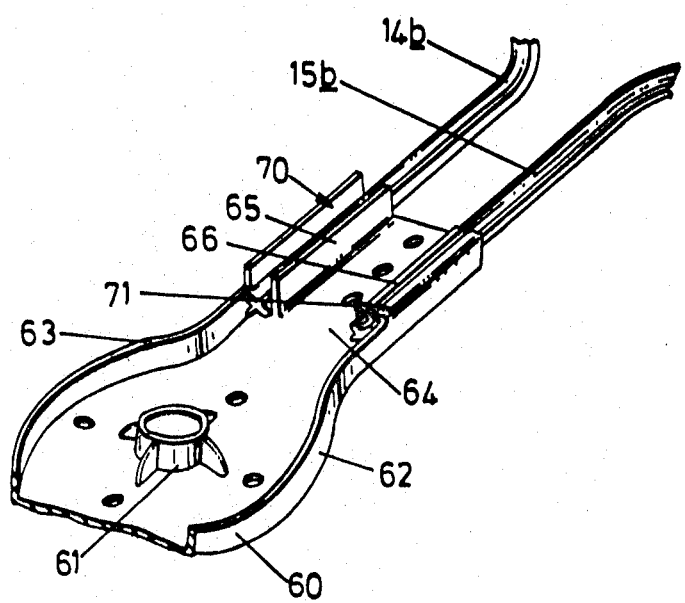
Figure 6A:
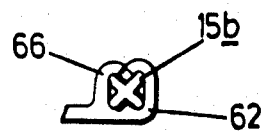

The invention is illustrated merely by way of example in the accompanying drawings in which, FIG. 1 is a partial cross-section through a steering wheel according to the present invention, FIG. 1A is a section of the wheel shown in FIG. 1 on the section line 1 of FIG. 1, FIG. 2 is a view of the steering wheel of FIG. 1 taken in the direction of arrow 2 of that Figure, FIG. 2A shows in perspective view a component of the steering wheel, FIG. 3 is a view of part of the steering wheel taken in the direction of arrow III of FIG. 1, FIG. 4 is a view of an alternative form of steering wheel but having the same construction as that of FIGS. 1 to 3, FIG. 5 is a perspective view of part of a modified form of steering wheel, FIG. 6 is a perspective view showing a further embodiment of a steering wheel according to the present invention, and FIG. 6A is a perspective view of a detail of FIG. 6.

Referring to the drawings and in particular FIGS. 1 to 3, a steering wheel comprises a rim 10, two radial spokes 11 and 12 and a hub 13. The rim comprises two metal wires of cruciform cross-section 14, 15 each wire having a semi-circular portion which forms part of the rim 10. Each wire terminates in two substantially radial portions 14a and 14b and 15a and 15b respectively, which form spoke parts. Thus the rim has two separately made metallic sections each of which is bent inwards at its ends to form spoke parts.

The hub 13 is formed from two sheet metal plates 16 and 17 of channel section which fit one within the other. The plates 16, 17 as fitted together define channels 18, 19 which receive the ends 14a, 14b and 15a and 15b of the wires 14, 15 respectively. The plates 16, 17 are riveted together.

Riveted into a central aperture 25 in the plates 16, 17 is a precision splined boss 26 by which the wheel may be attached to the steering column of a vehicle.

At the radially outermost portions of the spokes 11, 12 the wires 14, 15 approach closest to one another, i.e., at the locations 30, 31 in FIG. 2. At these locations are positioned strengthening members of which one, referenced 32, appears in FIG. 2. This member 32 adds rigidity to the rim by connecting the wires 14, 15 together at this location.

The assembly of wires and hub is placed within injection mould which is then operated to form a covering around the wires but not the hub. The covering may be of polyvinyl chloride plastics material.

FIG. 4 shows an alternative form of the steering wheel illustrated in FIGS. 1 to 3. The construction of this wheel is similar to that of FIGS. 1 to 3 except that the rim comprises three wires 40-42 and has three spokes, the wire 40 being substantially circular in shape whilst the wires 41, 42 are substantial of quadrantal shape.

Clearly as many spokes as is desired can be constructed using the same principles of construction.

FIG. 5 shows part of an alternative form of wheel construction. Metal wires are used to provide the rim and radial spokes of a wheel but in place of the two plates 16, 17 of FIGS. 1 to 3 a single plate 50 is used. The hub 50 provides a central disc 51 from which extend two opposing arms 52 (only one is shown) to provide a two spoke wheel. Clearly more arms can be provided according to the number of spokes required in the wheel. The hub 50 also provides two opposed flanges 53, 54 on each arm 52 which are bent over the ends 14b, 15b of the spoke-providing wires. The flanges 53, 54 which effectively crimp the wires 14b, 15b are then welded or riveted to their respective arms 52, at the positions indicated by the crosses.

FIG. 6 shows a further construction available for forming vehicle steering wheels according to the present invention. In place of the sheet metal hubs of previous Figures, a hub provided by a steel drop forging 60 is used having splined boss 61. The forging 60 is provided with opposed flanges 62, 63 and opposed arms 64 of which only one is shown. The forgoing is also provided with opposed inner flanges 65, 66 which define with the outer flanges 62, 63 two channels 70, 71 in which the ends of the wires 14b and 15b are placed. The upper sections of the flanges 62, 63 and 65, 66 are deformed by pressing or hammering in the manner shown in FIG. 6a so that the cruciform wire sections 14b, 15b are crimped within the channels 70, 71 to secure the wire sections to the hub.

The use of the steel drop forging avoids the need to connect the central splined boss by rivets as shown in FIG. 1. Furthermore, the use of the channel sections to crimp the wire sections to the central steel drop forging avoids the welded or riveted flanges of FIGS. 5.

With all the wheels described above, a suitable covering is provided around the rim and spokes to finish the wheel. Such a covering may be an injection moulding of polyvinylchloride. Thus each section of the wheels is a covered wire of generally C-shape.

The cross-section of the wires used is not critical but is preferably substantially rectangular to facilitate a gripping and fixing operation in relation to the hub. A cruciform section which gives a substantially rectangular to facilitate a gripping and fixing operation in relation to the hub. A cruciform section which gives a substantially rectangular cross-section is preferred.

With the present invention there is provided a steering wheel construction in which the use of butt welds at potentially critical locations, e.g., the radially outer and radially inner ends of the wheel spokes, is avoided thereby providing a wheel which has fewer points of weakness in the event of accident impact, has fewer welding operations than the conventional wheel, and may have fewer components than a conventional wheel.

I claim:

1. A steering wheel for a vehicle and comprising a rim connected to a hub by spokes, wherein the rim comprises a plurality of separately made metallic sections each of which is bent inwards towards the hub to provide spoke parts, characterized in that the hub is metal and includes oppositely extending radial arms each provided with longitudinally extending flanges which are bent over in opposite directions to grip the inner ends of the spoke parts of each section.

2. A steering wheel according to claim 1 wherein each of the metallic sections is a covered wire of generally C-shape.

3. A steering wheel according to claim 2 wherein the rim has two sections each of which comprises a semi-circular rim portion with inwardly bent radial portions forming the spoke parts.

4. A steering wheel according to claim 2 wherein the rim has three sections one of which comprises a semi-circular rim portion with inwardly bent radial portions forming spoke parts whilst each of the other two sections is quadranted having inwardly bent radial portions which form spoke parts at right angles to one another.

5. A steering wheel according to claim 1 wherein the hub comprises two plates of channel-section one lying within the other to define channels which extend radially of the hub, the inner ends of the spoke parts of the sections being secured to the hub within the channels.

6. A steering wheel according to claim 1, said flanges defining channels, each metallic rim section is a covered wire of cruciform cross-section, the inner ends of the spoke parts lie in the channels, and the hub flanges are crimped over the inner ends of the spoke parts to secure the metallic rim section to the hub.

7. A steering wheel for a vehicle and comprising a rim connected to a hub by spokes, wherein the rim comprises a plurality of separately made metallic sections, each of which is bent inwards towards the hub to form spoke parts, wherein the hub comprises two plates of channel-section, one lying within the other to define channels which extend radially of the hub, the inner ends of the spoke parts of the sections being secured to the hub within the channels.

* * * * *